(12) United States Patent
Collins

(10) Patent No.: US 12,245,339 B2
(45) Date of Patent: Mar. 4, 2025

(54) ELECTRICAL HEATERS FOR EXHAUST AFTERTREATMENT SYSTEMS AND ASSEMBLIES

(71) Applicant: CORNING INCORPORATED, Corning, NY (US)

(72) Inventor: Thomas Adam Collins, Bradford, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/806,943

(22) Filed: Aug. 16, 2024

(65) Prior Publication Data

US 2024/0414814 A1    Dec. 12, 2024

Related U.S. Application Data

(63) Continuation of application No. 18/287,128, filed as application No. PCT/US2022/026362 on Apr. 26, 2022, now Pat. No. 12,082,312.

(60) Provisional application No. 63/279,366, filed on Nov. 15, 2021, provisional application No. 63/183,573, filed on May 3, 2021.

(51) Int. Cl.
| | |
|---|---|
| *H05B 3/06* | (2006.01) |
| *B33Y 10/00* | (2015.01) |
| *B33Y 80/00* | (2015.01) |
| *F01N 3/027* | (2006.01) |
| *F01N 3/20* | (2006.01) |
| *H05B 3/03* | (2006.01) |

(52) U.S. Cl.
CPC ............ *H05B 3/06* (2013.01); *B33Y 10/00* (2014.12); *B33Y 80/00* (2014.12); *F01N 3/0275* (2013.01); *F01N 3/2026* (2013.01); *F01N 2240/16* (2013.01); *H05B 3/03* (2013.01); *H05B 2203/003* (2013.01); *H05B 2203/022* (2013.01)

(58) Field of Classification Search
CPC .. F01N 3/0275; F01N 3/2026; F01N 2240/16; H05B 3/03; H05B 3/06; H05B 2203/003; H05B 2203/022
USPC .......................................... 60/300, 303, 320
See application file for complete search history.

(56) References Cited

U.S. PATENT DOCUMENTS 5,597,503 A * 1/1997 Anderson ............. F01N 3/2026
  422/174
2017/0273146 A1 * 9/2017 Everly ..................... H05B 3/16

\* cited by examiner

*Primary Examiner* — Jorge L Leon, Jr.
(74) *Attorney, Agent, or Firm* — Kurt R. Denniston

(57) ABSTRACT

An electrical heater assembly and an exhaust treatment assembly. The electrical heater assembly includes a heater body including an array of intersecting walls that form a plurality of channels extending in an axial direction. The intersecting walls and channels together define a honeycomb pattern of cells. A plurality of slots extend from an outer periphery of the heater body and terminate within the heater body. Each of the plurality of slots disconnects some of the cells of the heater body from each other to define a serpentine current-carrying path through the heater body. Each slot comprises a receptacle portion located between opposing portions of the slot. A plurality of slot separators located respectively in the receptacle portions. Each slot separator has dimensions greater than the opposing portions of the slot to provide support to the heater body in all directions perpendicular to the axial direction.

20 Claims, 7 Drawing Sheets

ELECTRICAL HEATERS FOR EXHAUST
AFTERTREATMENT SYSTEMS AND
ASSEMBLIES

CROSS REFERENCE TO RELATED APPLICATION

This application is a continuation application of U.S. application Ser. No. 18/287,128, filed on Oct. 16, 2023, which is a National Stage application under 35 U.S.C. § 371 of International Application No. PCT/US2022/026362 filed on Apr. 26, 2022, which claims the benefit of priority under 35 U.S.C. § 119 of U.S. Provisional Application Ser. No. 63/279,366 filed on Nov. 15, 2021, and of U.S. Provisional Application Ser. No. 63/183,573 filed on May 3, 2021, the contents of which are relied upon and incorporated herein by reference in their entireties.

FIELD

This disclosure relates to electrical heaters, and more particularly to exhaust aftertreatment systems and assemblies that comprise electrical heaters.

BACKGROUND

Temperature control can be useful during the treatment of fluid streams. For example, catalytic materials can be used in the treatment of fluid flows, such as in the aftertreatment of engine exhaust. Catalytic activity of such materials may not initiate until the catalytic material reaches some minimum threshold temperature, which may be referred to as the light-off temperature. Overall emissions can be reduced by minimizing the amount of time the catalyst is below its light-off temperature while the engine is in operation. Electrical heaters provide one manner for assisting in control of temperature during treatment of a fluid stream, such as to increase the temperature of a catalyst material.

SUMMARY

Disclosed herein are various embodiments for electrical heaters, particularly for use in vehicle exhaust aftertreatment systems.

In embodiments, an electrical heater assembly comprises a heater body comprising an array of intersecting walls that that form a plurality of channels extending in an axial direction, the intersecting walls and channels together defining a honeycomb pattern of cells; a plurality of slots extending from an outer periphery of the heater body and terminating within the heater body, each of the plurality of slots disconnecting some of the cells of the heater body from each other to define a serpentine current-carrying path through the heater body, wherein each slot comprises a receptacle portion located between opposing portions of the slot and having dimensions greater than the opposing portions to provide support to the heater body in all directions perpendicular to the axial direction.

In embodiments, widths of the opposing portions of each of the plurality of slots are equal.

In embodiments, the heater assembly further comprises a slot separator located in each of the receptacle portions.

In embodiments, each slot separator is wider than the opposing portions of the slot in which the slot separator is located.

In embodiments, each slot separator has a shape that is complementary to that of the receptacle portion in which the slot separator is located.

In embodiments, the slot separators are a plurality of discrete elements from each other.

In embodiments, a plurality of the slot separators extend from a common hub.

In embodiments, the common hub is a retaining ring.

In embodiments, each of the slot separators extends from a transverse flange, and wherein the transverse flange is engaged against an end face of the heater body when the slot separator is located in the receptacle portion.

In embodiments, each of the slot separators comprises a tail that extends out of the corresponding slot through the outer periphery of the heater body and engages against the outer periphery of the heater body.

In embodiments, the width of one or both of the opposing portions of each slot is equal to one of the cells.

In embodiments, at least one dimension of the receptacle portion spans up to three of the cells.

In embodiments, the heater assembly further comprises a pair of electrodes connected to the heater body at opposing ends of the serpentine current-carrying path.

In embodiments, the heater assembly further comprises a double-ended slot having two end portions terminating within the heater body.

In embodiments, the heater assembly further comprises a catalyst material on or in the heater body.

In embodiments, at least one of the receptacle portions has a first cross-sectional shape that is different than a second cross-sectional shape of at least one other of the receptacle portions.

In embodiments, cross-sectional shapes of the receptacle portions are circular, rectangular, square, polygonal, trapezoidal, ellipsoidal, or a combination thereof.

In embodiments, an exhaust treatment assembly comprises the heater assembly of any of the preceding paragraphs and an aftertreatment component contained together in an outer housing.

In embodiments, the aftertreatment component comprises a catalyst substrate or particulate filter.

It is to be understood that both the description herein is directed to exemplary aspects and examples, and thus are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
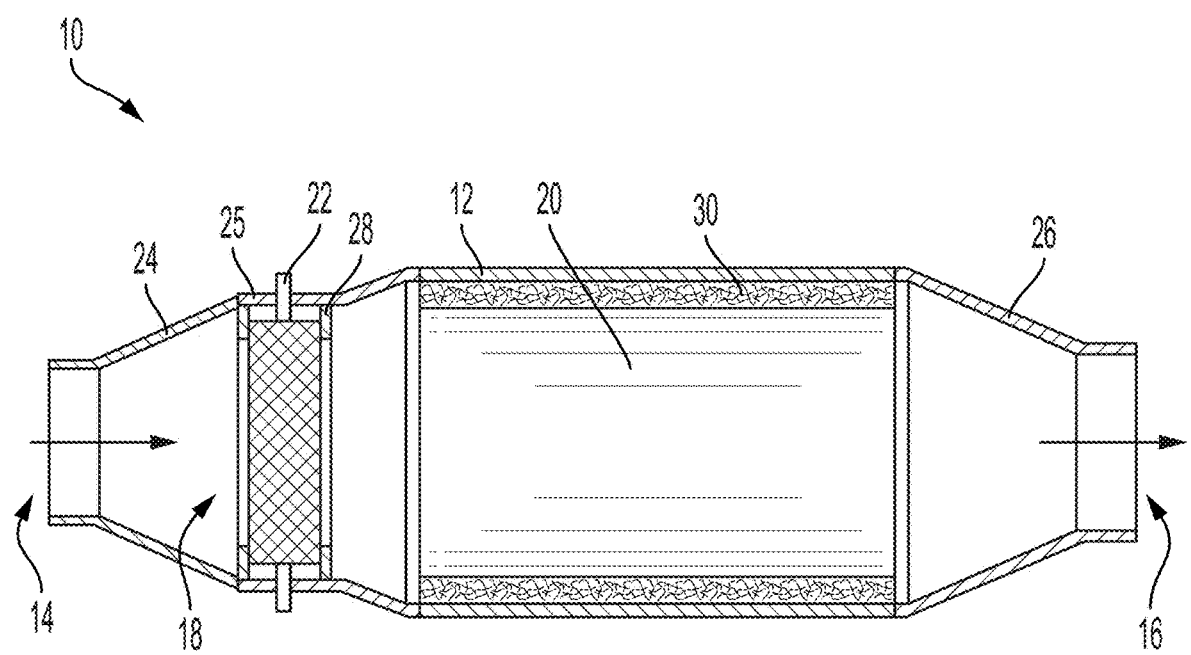
FIG. 1 is cross-sectional side view of an exhaust aftertreatment assembly according to embodiments disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Modifications of the disclosure will occur to those skilled in the art and to those who make or use the disclosure. Therefore, it is understood that the embodiments shown in the drawings and described herein are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to also include the specific value or end-point referred to.

Directional terms as used herein—for example up, down, right, left, front, back, top, bottom—are made only with reference to the figures as drawn and are not intended to imply absolute orientation. As used herein, the term "radial" refers to directions perpendicular to the indicated axial direction that extend from the center point (center axis) of a shape to or toward the outer perimeter of the shape, regardless of the shape of the component or feature with respect to which the radial direction is used. Similarly, the term "diameter" as used herein is not limited to circular shapes, but instead refers to the longest dimension of a component that passes through the center point (center axis) of the shape of that component. For example, a radial distance of a square-shaped component can be measured as the straight-line distance from the center point (center axis) to an intersection with one of the walls of the square, while the diameter of a square refers to the longest dimension diagonally across the square. The terms "cross-sectional width" or "cross-sectional dimension" may also be used to refer to these directions perpendicular to the axial direction.

Fluid treatment systems, such as automobile exhaust aftertreatment systems, can comprise a supplemental source of heat to facilitate faster catalyst light-off, particularly in comparison to catalyst-containing aftertreatment systems that do not have any supplemental heat (e.g., instead relying on the heat of the engine exhaust). For example, heat can be supplied by an electric heater (e.g., arranged to transfer heat to the catalyst material) or an electrically heated catalyst substrate (e.g., an electrically conductive substrate that is carrying a catalytic material). For example, a heater can be arranged upstream of a catalyst substrate and heat the catalyst by providing heat to the flow of exhaust (or supplemental air), which in turn heats the catalyst. Aftertreatment systems employing supplemental heat can be provided to reduce emissions in gasoline, diesel, and/or hybrid vehicles to assist in ensuring fast and consistent light-off of the catalyst during operation of the corresponding engine, particularly after cold-start of the engine.

Referring now to FIG. 1, a fluid treatment assembly 10 is illustrated, e.g., which can be arranged as part of an exhaust system of automobile. The fluid treatment assembly 10 comprises an outer housing 12 (which may be alternatively referred to as a "can"), such as formed in a generally tubular shape (hollow tube) from metal or suitable material. The tubular housing 12 has an inlet 14, e.g., which can be connected in fluid communication with the exhaust manifold of an internal combustion engine, and an outlet 16, e.g., which can be connected in fluid communication with a tail pipe of an automobile.

A flow of fluid, such as exhaust from an engine can be treated (e.g., one or more pollutants removed or abated) as the exhaust is flowed from the inlet 14 to the outlet 16 through the assembly 10. To this end, the assembly 10 further comprises a heater assembly 18 and an aftertreatment component 20 located between the inlet 12 and outlet 14. For example, the aftertreatment component 20 can be a catalyst-loaded substrate, a particulate filter, or a catalyst-loaded particulate filter. For example, catalyst substrates and particulate filters can comprise a porous ceramic honeycomb body having an array of walls that form a plurality of fluid flow paths or channels extending axially (in the direction of exhaust flow and/or perpendicular to the end faces of the body) through the body.

A vehicle exhaust system can be created by connecting additional lengths of piping (not shown) to the assembly 10 at the inlet 14 (e.g., extending between the inlet 14 and the engine exhaust manifold) and outlet 16 (e.g., extending from the outlet 16 to the tail pipe). Depending on the design or configuration of the exhaust system, which may vary vehicle to vehicle, the various components and/or lengths of piping can have different diameters at different positions along the flow path through the exhaust system. For example, the housing 12 can comprise a first transitional portion 24, e.g., at an upstream end and a second transitional portion 26, e.g., at a downstream end. The transitional portions 24, 26 are portions of the housing 12 that enable or provide a change of dimension in the housing 12. For example, both of the transitional portions 24, 26 are tapered in FIG. 1. However, the transitional portions 24, 26 can be stepped, conical, tapered, radiused, parabolic, or other shape that transitions from a first dimension to a second dimension. For example, the transitional portion 24 transitions the housing 12 from a first diameter at a first portion 25 of the housing 12 (at which the heater assembly 18 is positioned) to a second diameter of the housing at the end 14.

As described herein, the heater assembly 18 can be a resistance heater that provides supplemental heat in order to facilitate functionality of the aftertreatment component 20, e.g., by quickly initiating light-off of catalytic material disposed in or on the walls of the heater assembly 18 and/or the aftertreatment component 20. For example, the heater assembly 18 can comprise, or otherwise be connected to, electrodes 22. The electrodes 22 can be arranged extending through the housing 12 in order to connect the heater assembly 18 to a power source, such as a vehicle battery. As shown in FIG. 1, the electrodes 22 can extend radially through the through the first portion 25 of the housing 12. However, the electrodes 22 can alternatively extend through the housing 12 at some other location or angle, such as axially through the transitional portion 24 of the housing 22. In this way, the heater assembly 18 can be arranged to generate heat via Joule heating when the heater assembly 18 is connected via the electrodes 22 to a power source and a corresponding voltage is applied to create a flow of current through the material of the heater assembly 18. The electrodes 22 are shown in FIG. 1 as being arranged on opposite sides of the heater assembly 18 (e.g., spaced 180° apart with respect to the exterior of the heater assembly 18), but can be arranged at other locations or angles, such as positioned at an angle of 90 degrees relative to each other, 60 degrees relative to each other, 45 degrees relative to each other, 30 degrees relative to each other, or even closer.

In some embodiments, such as shown in FIG. 1, the heater assembly 18 is positioned upstream of the aftertreatment component 20 in order to increase the temperature of the exhaust flow and/or provide direct heating to the aftertreatment component 20, which in turn increases the temperature aftertreatment component 20, such as the temperature of the catalytic material carried by the aftertreatment component 20, as the exhaust flows through the aftertreatment component 20. In some embodiments, the heater assembly 18 and the aftertreatment component 20 can be effectively combined into a single device by directly loading the heater body of the heater assembly 18 with a catalyst. Such arrangements useful for heating a catalyst material may be referred to as an electrically heated catalyst, or EHC.

In this way, the inlet and outlet ends 14, 16 can be used to facilitate connection of the assembly 10 between exhaust piping of different diameters. In other embodiments, one or both of the upstream and downstream ends 14, 16 can have substantially the same diameter as the lengths of piping to which they are connected. Instead of tapers, the exhaust system can alternatively or additionally transition between different dimensions at abrupt steps. In some embodiments, such as shown in FIG. 1, the housing 12 transitions between different diameters at the heater assembly 18 and the aftertreatment component 20. However, in other embodiments, the housing 12 can be substantially the same dimension at both the heater assembly 18 and the aftertreatment component 20, e.g., such as in embodiments in which the heater assembly 18 and the aftertreatment component 20 have the same diameter.

The heater assembly 18 and the aftertreatment component 20 can be held in place, supported, and/or contained within the housing 12 in any suitable manner. For example, the body of the heater assembly 18 can be held in place and supported via one or more retainers 28, e.g., retaining rings. The aftertreatment component 20 can be supported by similar retainers and/or supported by a mat 30, such as an inorganic fiber mat, which assists in protecting the aftertreatment component, such as from vibrations or thermal expansion forces exerted on the aftertreatment component 20.

Figure 2:
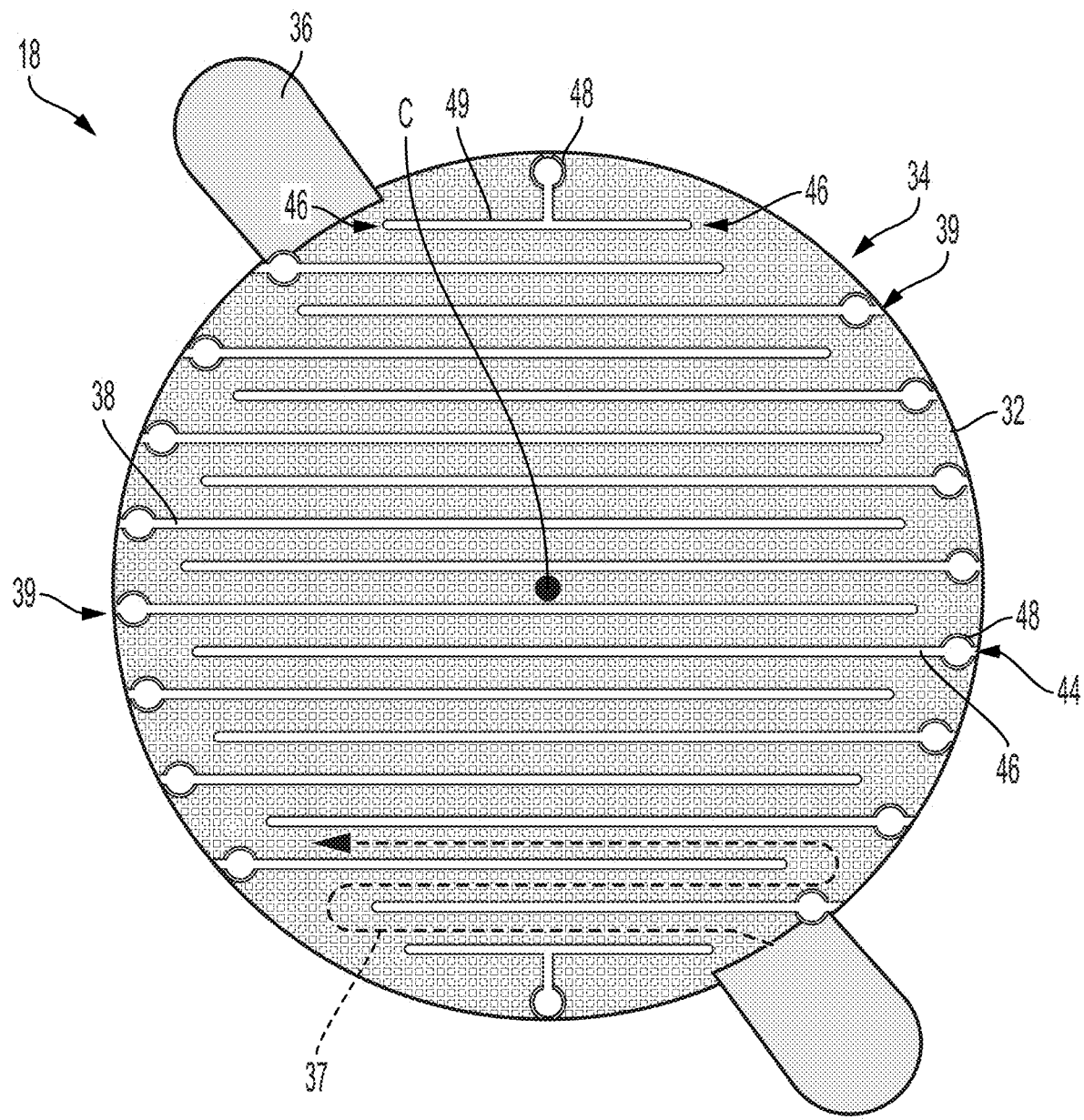
FIG. 2 is a front view of a heater body according to embodiments disclosed herein.

The heater assembly 18 comprises a body 32 made of electrically conductive material that comprises a resistive (heat-generating) portion 34 and one or more electrode attachment portions 36 (two attachment portions 36 illustrated in FIG. 2). The body 32 and/or the resistive portion 34 thereof can be formed having a shape centered axially at a central axis C. The electrode attachment portions 36 can extend radially from the resistive portion 34, such as shown in FIG. 2, or be radially contained within the footprint or outer periphery of the resistive portion 34, such as shown in FIG. 8. The electrode attachment portions 36 and the resistive portion 34 can be formed from the same material. The attachment portions 36 can be integrally (monolithically) formed with the resistive portion 34, or connected via welding, mechanical fasteners, or other attachment means.

An electrical connection can be established through the resistive portion 34 via one or more electrodes 22 secured at the one or more electrode attachment portions 36 for carrying current to, from, and/or between the electrodes 22 at the electrode attachment portions 36. For example, the properties of the resistive portion 34 (e.g., resistivity/conductivity and dimensions) can be set with respect to the voltage applied across the electrodes 22 in order to generate heat as electrical current passes through the material of the resistive portion 34 of the body 32. In other words, the material properties and dimensions of the structure of the heater body 32 that defines the current-carrying path between the electrodes 22 can be set such that the electrical heater assembly 18 generates a targeted amount of heat and/or reaches a targeted temperature when a selected voltage is applied across the heater body 32. Applied voltages can range from relatively low voltages capable by traditional vehicle batteries to relatively high voltages capable by higher capacity batteries included on hybrid or electrical vehicles, such as over a range of 12V to 400V, or even more. Target temperatures achieved by the heater body 32 when the selected voltage is applied can range, for example, from about 500° C. to 1200° C., such as a temperature of up about 1000° C.

Figure 3:
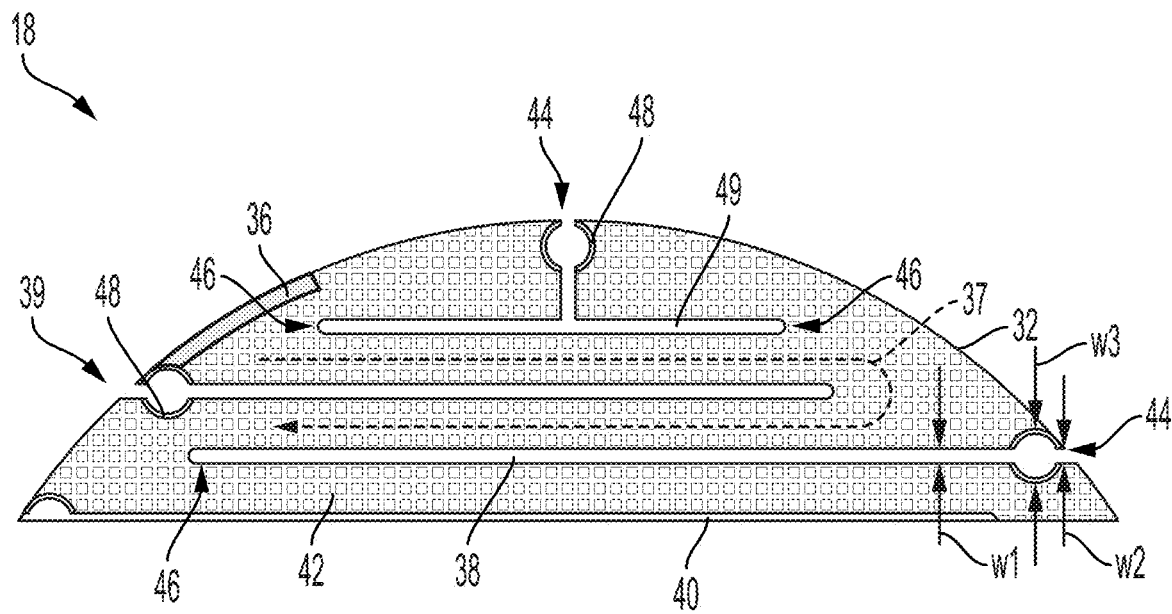
FIG. 3 is an enlarged view of a portion of a heater body according to embodiments disclosed herein.
Figure 4:
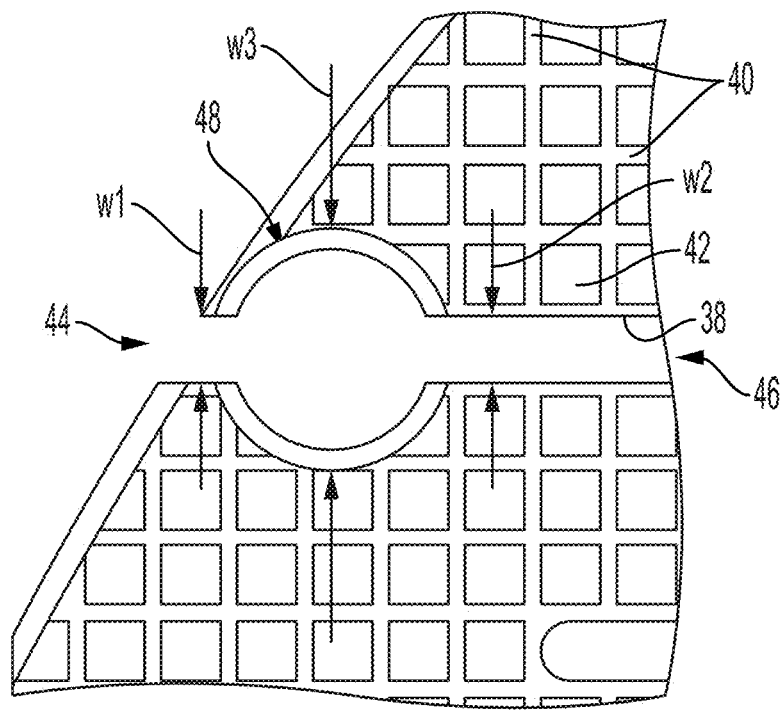
FIG. 4 is an enlarged view of a receptacle portion of a heater body according to embodiments disclosed herein.

In the embodiment of FIGS. 2-4, and as labeled in the enlarged views of FIGS. 3-4, the resistive portion 34 of the body 32 comprises an array of intersecting walls 40 that form a plurality of channels 42 extending in an axial direction through the body 32, and thus is of the type that may be referred to as a honeycomb body. For example, the channels 42 enable a fluid to flow through the body 32 (e.g., a flow of exhaust fluid) and the intersecting walls 40 provide surface area for heat exchange with the fluid flow. Each of the sections of the walls that are enclosed together to define one the flow channels 42 may be referred to herein as a cell. Accordingly, the array of walls 40 in FIGS. 2-4 define a corresponding array of square-shaped cells, which together form a honeycomb design for the body 32. However, the cells can have any other desired cross-sectional shape (the shape perpendicular to the axial direction), such as hexagonal, triangular, or other polygon. Furthermore, in some embodiments, in lieu of geometrically-shaped cells and channels, the resistive portion 34 of the body 32 comprises irregular flow paths, such as an irregular interconnected porous structure. For example, in embodiments, the resistive portion 34 of the body 32 can be comprised of a foam-like or interwoven fiber (or other elongated fiber-like or wire-like elements) configuration of conductive material in which the flow paths through the body 32 are irregularly formed by the pores, voids, openings, or interstices in the foam-like structure and/or between interwoven fibers or fiber-like elements of conductive material. In embodiments, the body 32 can be formed by additive manufacturing, perforation of a sheet of conductive material, extrusion, casting, sintering, weaving of wires or fibers into a mesh, mat, or screen, foaming an electrically conductive material, or other suitable process or combination thereof.

The body 32 further comprises cutouts, slits, or slots 38 (hereinafter slots 38) that create disconnections, e.g., gaps, that break electrical conductivity at certain locations in the body 32, for example, by severing, breaking, or disconnecting portions of the body 32 from each other, thereby forcing electrical current to flow in a designated path around these disconnected portions. For example, the slots 38 can be air gaps, or filled with an electrically insulating material.

As shown in FIG. 2, the slots 38 extend across the body 32 alternatingly from opposite sides of the body 32, such that the material of the body 32 (e.g., intersecting walls 40) is connected together in a serpentine pattern that doubles back on itself across the body 32 multiple times. The slots 38 intersect the outer periphery of the resistive portion 34 of the body 32 at intersections 39. Thus, the intersections 39 caused by the slots 38 create a corresponding disconnection, break, or gap in the outer periphery of the resistive portion 34. A portion of the serpentine path is indicated by a dashed arrow 37 in FIG. 2. As a result, electrical current carried through the material of the body 32 between the electrodes 22 is forced along the serpentine path 37. The serpentine path 37 is not limited to that shown in FIG. 2, as the slots 38 can be included at different lengths, angles, widths, or other dimensions in order to set other shapes for the serpentine path.

Accordingly, the electrical disconnections caused by the slots 38 enables the current path length between the electrodes 22 to be increased, as the electrical current is forced to traverse back and forth across the body 32 multiple times instead of directly flowing in a straight line directly between the electrodes 22. Since the overall resistivity of the heater body 32 is dependent on the overall current-carrying path length between the electrodes 22, the resistivity of the heater assembly 18 can be set, at least in part, by selecting the dimensions, locations, and number of slots 38 (thereby setting the dimensions of the serpentine current-carrying path).

As also shown in FIGS. 2-4, the slots 38 extend from a first end portion 44 that extends from the intersections 39 with the outer periphery of the heater body 32 to a second end portion 46 that terminates within the heater body 32. The second end portions 46 of the slots 38 can have a shape that is different than that of the intersecting walls 40 that form the body 32, such as filleted, rounded, beveled, tapered, or pointed. For example, the second end portions 46 are illustrated as being rounded in the embodiment of FIGS. 2-4. The first end portion 44 and the second end portion 46 can have any suitable length. For example, in FIGS. 2-4 the first end portion 44 is illustrated as having a length of only about as much as the width of a single one of the cell in the intersecting array of walls 40, or less.

As labeled in FIGS. 3 and 4, the first end portion 44 of each slot 38 has a first width w1 and the second end portion 46 has a second width w2. As described further herein, the slots 38 also comprise a receptacle portion 48 (or simply "receptacle"), e.g., an enlarged cavity, that is relatively wider than the first and second end portions 44 and 46. In other words, the heater body 32 comprises a widened intermediate portion (e.g., the receptacle portion 48) that is located between narrower end portions (e.g., the end portions 44 and 46). Accordingly, the first end portion 44 spaces the receptacle portion 48 away from the outer periphery of the heater body 42 and provides a restriction, choke, or narrowing in the slots 38 between the outer periphery of the body 32 and the receptacle portions 48. For example, as labeled in FIGS. 3 and 4, the receptacle portion 48 has a third width w3 that is larger than the first width w1 of the first end portion 44 of the slot 38 and that is also larger than the second width w2 of the second end portion 46 of the slot 38. As used herein, the widths w1, w2, w3 refer to the dimension of the slot 38 and/or receptacle portion 48 in a direction generally transverse, e.g., perpendicular, to the lengthwise direction of slot 38.

As described herein, the relatively enlarged third width w3 facilitates the heater body 32 to receive slot separators in the receptacle portions 48. The re-narrowing of the slot 38 back to the width w1 facilitates the slot separators not only maintaining the slots 38 to be open width-wise (e.g., thereby preventing electrical shorts), but also assists in providing lateral support (that is, in directions perpendicular to the axial direction) for the body 32 when the heater assembly 18 is assembled. The area of the body 32 surrounding the receptacle portions 48 can be thickened, e.g., compared to the thickness of the intersecting walls 40 of the body 32, to provide additional support for heater assembly 18 at the slot separators. For example, thickening the walls of the receptacle portions 48 may enable a stronger wear surface for the receptacle portions 48, thereby resisting abrasion of slot separators (discussed below) within the receptacle portions 48 when used in a vibrating environment, such as during use in a vehicle's exhaust aftertreatment system.

In embodiments, the first and second widths w1 and w2 respectively of the first and second end portions 44 and 46 of the slots 38 are equal or approximately equal to each other. In embodiments in which the body 32 comprises the array of intersecting walls 40, the first width w1, the second width w2, or both, are equal to the width of one or more whole cells formed by the intersecting walls 40. For example, the first and second widths w1 and w2 are illustrated as approximately equal to the width of one cell in the embodiment of FIGS. 2-4. In embodiments, the width (e.g., diameter) of the receptacle portions 48 is also approximately equal to the width of one or more whole cells defined by the array of intersecting walls 40. In embodiments, the width of the receptacle portions 48 is from one to three cells, such as approximately three cells as shown in FIGS. 2-4.

In FIG. 3, the body 32 comprises a double-ended slot 49 that substantially resembles the slots 38 having the first end portion 44 that intersects with the outer periphery of the body 32 at one of the intersections 39 and the receptacle portion 48 proximate to the first end portion 44. However, on the opposite side of the receptacle portion 48, the double-ended slot 49 splits into two of the second end portions 46, each of which second end portions 46 terminates within the body 32. The first end portion 44 of the double-ended slot 49 extends transversely, e.g., perpendicularly, to the two second end portions 46. In the embodiment of FIG. 3, the two second end portions 46 of the double-ended slot 49 extend at 180 degrees relative to each other, thereby providing a T-shape for the double-ended slot 49. However, the two second end portions 46 in other embodiments can extend at different angles, e.g., providing a Y-shape, W-shape, or other shape for the double-ended slot 49. Similar to the slots 38, the electrical disconnections created by the double-ended slot 49 assist in directing the flow of current to portions of the body 32 that are not disconnected. For example, with reference to FIG. 3, the presence of the double-ended slot 49 creates a "dead zone" in an area proximate to the electrode attachment portions 36 near the outer periphery of the body 32 that would otherwise be substantially blocked by the retaining ring 28 (see FIG. 1) or other support structure. In this way, the "dead-zone" created by the double-ended slot 49 can assist in directing current away from the areas of the heater body 32 that do not significantly participate in heat transfer during operation, thereby increasing operational efficiency and reducing wasted heat generation.

The receptacle portions 48 can receive slot separators, e.g., electrically insulating components, such as rods, blocks, or bars, to ensure the slots 38 remain open. For example, during operation, the body 32 may experience forces, such as from vibration or thermal expansion, which might cause physical deformation of the body. In this way, the slot separators assist in preventing the slots 38 "closing", i.e., in which portions of the walls on opposite sides of the slots 38 come into electrical contact with each other, which may result in an electrical short.

As noted herein, the first end portions 44 space the receptacle portion 48 away from the outer periphery of the heater body 42 and provide a restriction in the slots 38 between the outer periphery of the body 32 and the receptacle portions 48. Advantageously, these restrictions that are provided by the first end portions 44 having a width that is less than that of the receptacle portions 48 assists in supporting slot separators that are positioned in the receptacle portions 48. For example, a slot separator positioned in one of the receptacle portions 48 and having dimensions greater than the widths w1 and w2 will be supported in all lateral directions (e.g., left, right, up, or down with respect to the orientation of FIGS. 2-4). In this way, the receptacle portions 48 being spaced away from the outer periphery of the body 32 advantageously assists in maintaining the engagement of slot separators in the receptacle portions 48, such as from vibration or thermal expansion of the components of the heater assembly 18 during operation, and thereby providing mechanical stability to the electrical heater assemblies described herein.

Figure 5A:
FIGS. 5A-D illustrate slot separators according to embodiments disclosed herein.

Slot separators can be formed as axially extending portions of the retaining rings 28 or as discrete structural components. The slot separators can be held in the receptacle portions 48 such as via a friction fit, via a flange, head, cap, or lip, or otherwise affixed with adhesives, welding, or mechanical fasteners. The slot separators can be at least partially made of a generally nonconductive material (e.g., a ceramic or dielectric material or coating), such that slot separators 50 maintain electrical isolation of the portions of the heater body 32 on opposite sides of the slots 38 when the selected voltage is applied across the heater body. Examples of various slot separators are shown in FIGS. 5A-5D. FIG. 5A illustrates a first embodiment in which a slot separator 50 is a discrete component that resembles a cylinder. For example, the circular cross-sectional shape of the slot separator 50 corresponds to the circular cross-sectional shape of the receptacle portions 48 in FIGS. 2-4. However, the slot separators and receptacle portions are not limited to circular cross-sectional shapes. For example, the receptacle portions 48 can have a generally square, rectangle, triangular, circular, ellipsoidal, polygonal, or other shape, and the slot separators can be complementarily shaped. In this way, each of the receptacle portions 48 can be filled by a respective individual one of the slot separators 50. While the slot separator 50 is illustrated in FIG. 5A as being a solid part (e.g., resembling a rod or pin), the slot separator can alternatively be bent, crimped, hollow, or tubular, such as described with respect to FIG. 5D.

Figure 5B:
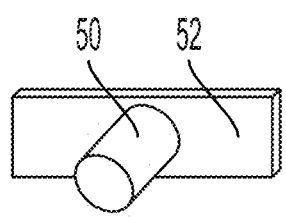

FIG. 5B illustrates an embodiment in which the slot separator 50 extends from a flange 52. For example, the slot separator 50 as described above as having a shape that is complementary to that of the receptacle portions 48 (e.g., a cylindrical shape correspond to the circular cross-sectional shape of the receptacle portions 48) and thereby configured to be received in a corresponding one of the receptacle portions 48. The flange 52 extends in a direction transverse, e.g., perpendicular, to that of the slot separator 50. Thus, the slot separator 50 can be inserted axially into the corresponding receptacle portion 48 until the flange 52 engages against the face of the heater body 32. In this way, the slot separator 50 of FIG. 5B can be both laterally supported (e.g., by the walls of the receptacle portion 48) and axially supported (e.g., by the flange 52 against the face of the heater body 32).

Figure 5C:
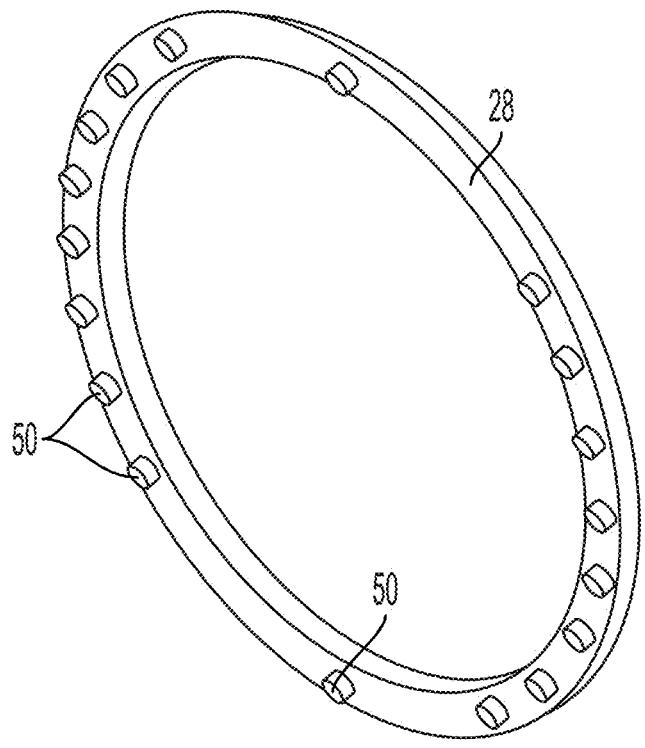

FIG. 5C illustrates an embodiment in which a plurality of the slot separators extend from the retaining ring 28 (e.g., see the retaining ring 28 as part of the assembly 10 in FIG. 1). In this way, as opposed to each receptacle portion 48 having a corresponding individual one of the slot separators 50 (such as in the embodiments of FIG. 5A or 5B), the slot separators 50 in FIG. 5C are commonly attached to the retaining ring 28 such that a plurality of the receptacle portions 48 (e.g., all of the receptacle portions 48) can be simultaneously filled by the slot separators 50 at once. Additionally, the retaining ring 28 extends transversely to the slot separators 50, such that the retaining ring 28 can act similarly to the flange 52 by providing axial support. Accordingly, the embodiment of FIG. 5C may be particularly advantageous to facilitate case of assembly, while also providing both axial and lateral support.

Figure 5D:
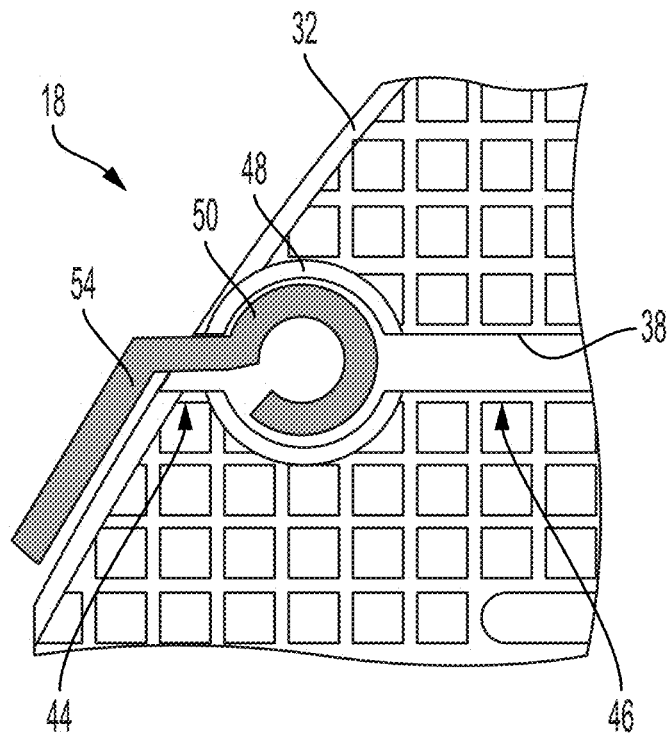

FIG. 5D illustrates an embodiment in which the slot separator 50 is formed from a piece of material that is bent, curved, crimped, or otherwise shaped into a generally hollow or tubular form having a shape complementary to the shape of the receptacle portion 48. In the embodiment of FIG. 5D, the slot separator 50 comprises a tail 54 that extends out of the first end portion 44 of the slot 38 and is engaged against the outer periphery of the heater body 32. Thus, similarly to the flange 52 of FIG. 5B and the retaining ring 28 of FIG. 5C, the tail 54 can provide additional support for the slot separator 50, albeit against the outer periphery of the heater body 32 instead of against the end face of the heater body 32 as with the embodiments of FIGS. 5B and 5C. The slot separator 50 comprising the tail 54 of FIG. 5D may be advantageous in some embodiments as it can be quickly and inexpensively manufactured by simply bending or otherwise shaping a plate or strip of material.

Figure 6:
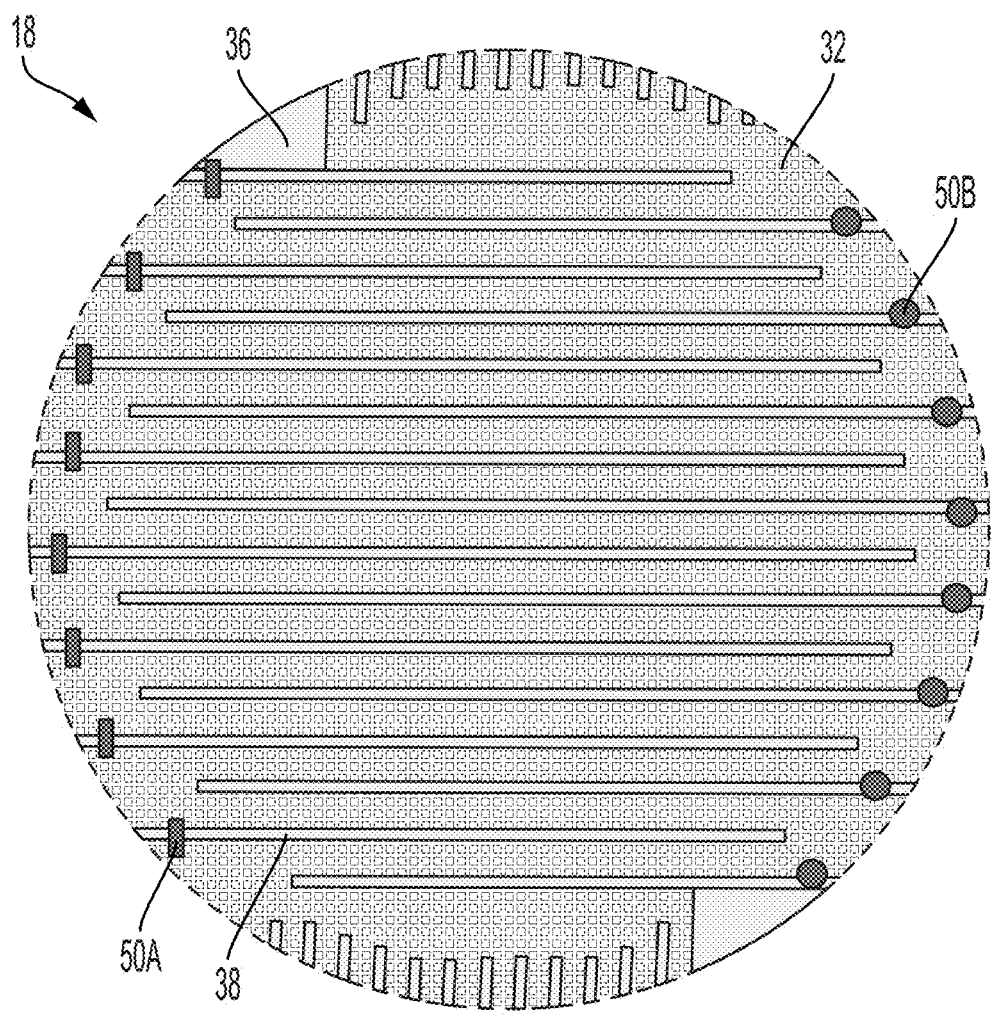
FIG. 6 is a front view of a heater body that comprise multiple differently shaped slot separator receptacles according to embodiments disclosed herein.

As described above, the slot separators 50 and the receptacle portions 48 can take various complementary shapes, e.g., both can have circular cross-sectional shapes. In embodiments, the heater assembly 18 can have multiple differently shaped slot separators and/or receptacles, or all of the slot separators and receptacles can be the same shape. For example, FIG. 6 illustrates an embodiment in which slot separators 50A (and their corresponding receptacle portions) on the left side of the drawing all have a rectangular shape, while slot separators 50B (and their corresponding receptacle portions) on the right hand side of the drawing all have a circular shape. Any suitable combination of shapes for the slot separators and receptacle portions can be included.

The heater body 32, as well as the slots 38 formed in the heater body 32, can be formed in any suitable manner. In embodiments, the heater body 32 is manufactured by three-dimensional printing, such as laser powder bed fusion, or other additive manufacturing process. In embodiments, the heater body 32 is formed as a single monolithic component (e.g., a sintered metallic or metal-containing body). In embodiments, the resistive portion 34 of the heater body 32 is formed simultaneously with the slots 38 and the receptacle portions 48 of the slots 38, such as via additive manufacturing processes where the various slot features can be simply printed into the design of the heater body. In embodiments, the slots 38 and/or the receptacles 48 are formed in one or more manufacturing steps by slitting, punching, cutting, into a body that does not yet contain the slots 38 and/or receptacle portions 48.

Figure 7A:
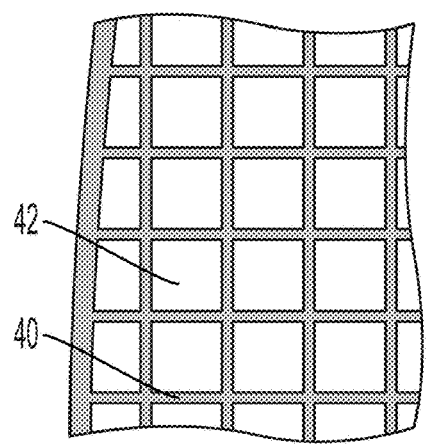
FIGS. 7A-7C show a sequence of steps for manufacturing a heater body according to embodiments disclosed herein.
Figure 7B:
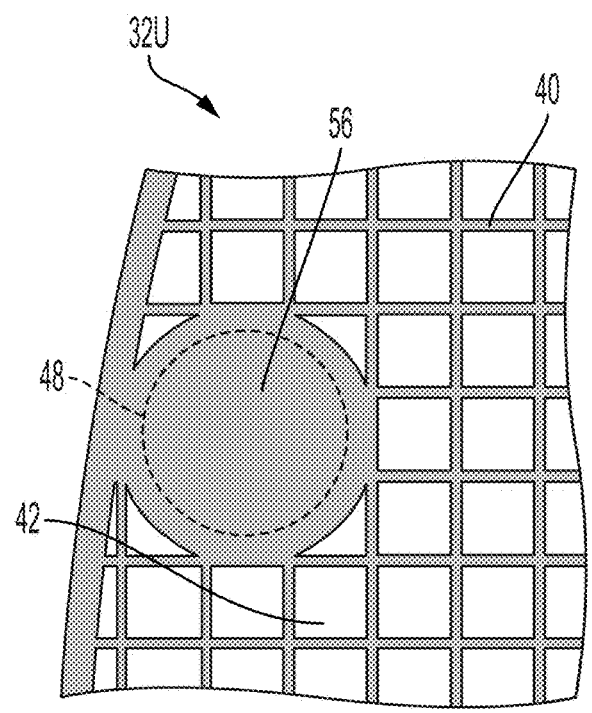
Figure 7C:
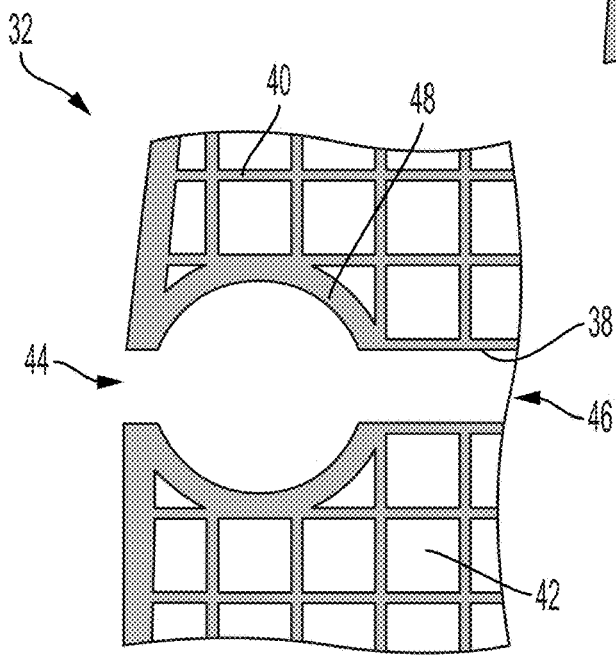

FIGS. 7A-7C illustrate three steps of a manufacturing process according to embodiments disclosed herein. In FIG. 7A, the heater body is first formed in an initial, unslotted state, designated as heater body 32U. Thus, the unslotted heater body 32U does not yet contain the slots 38 (or the receptacle portions 48 or the slots 38). For example, the unslotted heater body 32U can be formed by extrusion, e.g., of a metallic or ceramic precursor batch mixture, and then fired to react and/or sinter the particles in the batch mixture together into the unslotted body 32U. In FIGS. 7A-7C, the unslotted heater body 32U is illustrated as having a honeycomb design, comprising the array of intersecting walls 40 defining channels 42 extending through the body. However, as described herein with respect to the heater body 32 in general, the unslotted body 32U does not need to be configured as a honeycomb array of intersecting walls. For example, the unslotted body 32U can be formed by a foaming process, by interweaving or sintering together fibers, wires, or other elongated elements together.

After the unslotted body 32U is formed, the portions of the body at the intended locations for the slots 38 can be optionally reinforced. Accordingly, FIG. 7B illustrates that a section of the unslotted heater body 32U has been filled with a reinforcement material, which reinforcement material and/or the reinforced area may be referred to herein with the reference numeral 56. Namely, in the embodiment illustrated in FIG. 7B a plurality of the channels 42 defined by the intersecting array of walls 40 have been filled with the reinforcement material 56 in the area where the slots 38 and/or the receptacle portions 48 will be located. The section of the reinforcement material 56 that will ultimately be removed to form the receptacle portion 48 is illustrated in dashed lines in FIG. 7B. The reinforcement material 56 can be subjected to a heat treatment, e.g., sintering, in order to facilitate bonding of the reinforcement material 56 to the other material of the unslotted heater body 32U. For example, the reinforcement material 56 can be added while the unslotted heater body 32U is in a green (unsintered) state and thereby sintered together with the unslotted heater body 32U, or can be added after the unslotted heater body 32U has already undergone sintering and then the unslotted body 32U together with the reinforcement material 56 can be subjected to a second sintering operation.

As shown in FIG. 7C, the unslotted heater body 32U can be converted into the heater body 32 by formation of the slots 38 and/or the receptacle portions 48. Advantageously, the reinforcement material 56 may assist in providing support during a cutting or other material removal operation used to create the slots 38 and/or the receptacle portions 48. The reinforcement material 56 may additionally or alternatively assist in providing additional strength to the heater body 32 after the slots 38 and/or receptacle portions 48 are formed. The slots 38 and/or the receptacle portions 48 can be formed by any suitable cutting or material removal process, such as via a blade, saw, laser, punch, waterjet, electrical discharge machining (EDM), or other process or combination thereof.

Figure 8A:
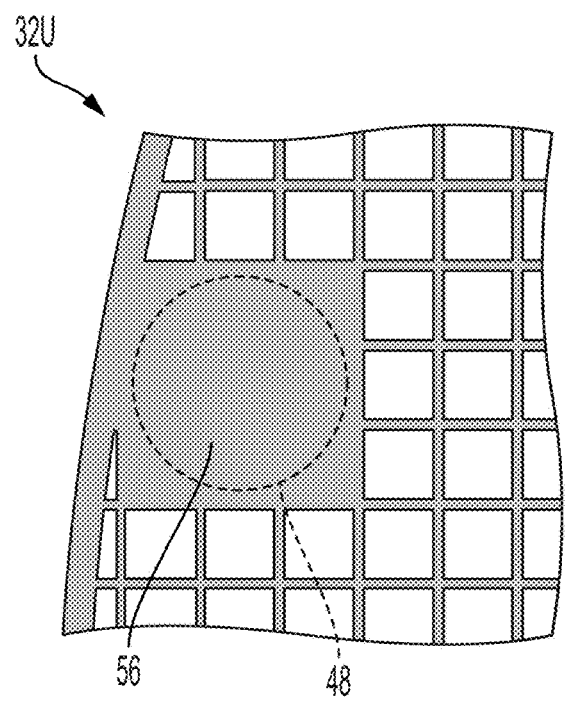
FIGS. 8A-8D illustrate various combinations of shapes and sizes for receptacles and reinforced areas according to embodiments herein.
Figure 8B:
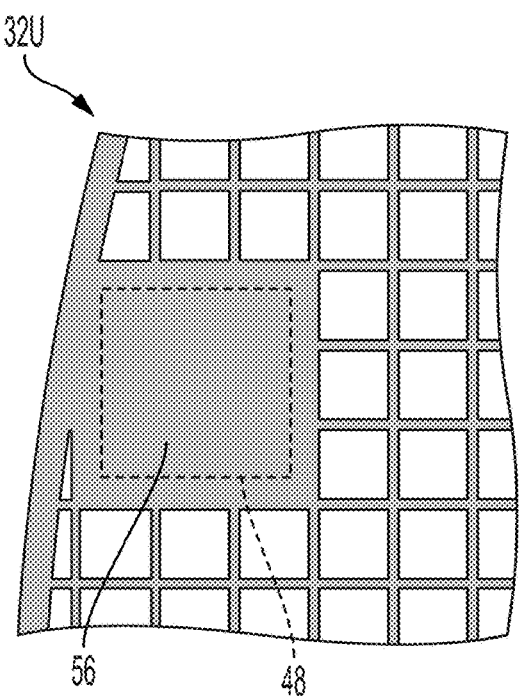
Figure 8C:
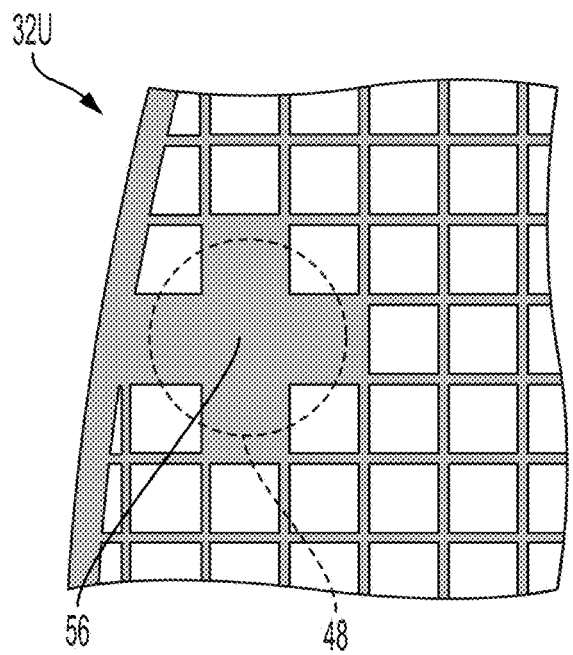
Figure 8D:
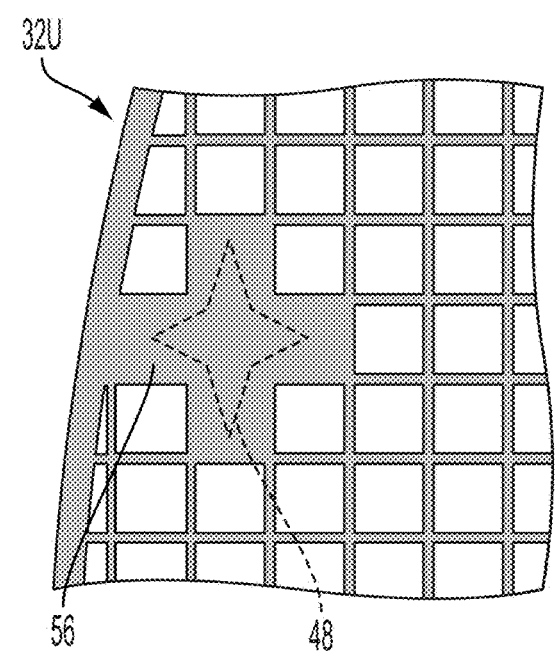

In embodiments, the shape and/or size of the reinforcement material 56 can be different from that shown in FIGS. 7A-7C, and also different from the general shape of the receptacle portion 48. For example, in FIG. 8A, the reinforcement material 56 is formed in a rectangle shape, while the intended shape for the receptacle portion 48 (shown in dashed lines) is a circle. In FIG. 8B, both the reinforced area 56 and the receptacle portion 48 are rectangular. In FIG. 8C, the reinforced area 56 has a cross or '+' shape, while the receptacle portion 48 has a circular shape. Accordingly, as illustrated in FIG. 8C, the reinforced area does not need to fully fill the area of the receptacle portion 48, as the receptacle portion 48 in FIG. 8C has some sections that are outside of the reinforced area 56. In FIG. 8D, the reinforced area 56 has a similar shape to FIG. 8C, with a generally star-shape for the receptacle portion 48. Additionally, it is noted again that the heater body 32 and/or 32U is not limited to a honeycomb array of intersecting walls, but can be another configuration such as a foamed or interwoven material. While FIGS. 8A-8D provide specific examples, those of skill in the art will recognize additional combinations of shapes and sizes for the reinforced area 56 and the receptacle portion 48 of the slots 38.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. An electrical heater assembly comprising:
   a heater body comprising:
      an array of intersecting walls forming a plurality of channels extending in an axial direction through the heater body so as to define a honeycomb pattern of cells:
      a plurality of slots each extending from an outer periphery of the heater body and terminating within the heater body so as to define a serpentine current-carrying path through the heater body, each slot including a receptacle portion located between opposing end portions of the slot; and
   a plurality of slot separators respectively arranged in each receptacle portion, each slot separator including a thickness greater than a width of each of the opposing end portions of the slot so as to laterally support the heater body in directions perpendicular to the axial direction.

2. The electrical heater assembly of claim 1, wherein, in each slot, the widths of the opposing end portions are equal to each other.

3. The electrical heater assembly of claim 1, wherein, in each slot, a shape of the slot separator corresponds to a shape of the receptacle portion.

4. The electrical heater assembly of claim 1, wherein each slot separator is a discrete element.

5. The electrical heater assembly of claim 1, wherein the plurality of slot separators extends from a common hub.

6. The electrical heater assembly of claim 5, wherein the common hub is a retaining ring.

7. The electrical heater assembly of claim 1, wherein each slot separator includes a transverse flange configured to engage an end face of the heater body.

8. The electrical heater assembly of claim 1, wherein, in each slot, the slot separator further includes a tail that extends out of the slot through the outer periphery so as to engage against the outer periphery.

9. The electrical heater assembly of claim 1, wherein, in each slot, the width of at least one of the opposing end portions is equal to a width of one cell of the pattern of cells.

10. The electrical heater assembly of claim 1, wherein, in each slot, a width of the receptacle portion spans up to three cells of the pattern of cells.

11. The electrical heater assembly of claim 1, further comprising a pair of electrodes respectively connected to opposing ends of the serpentine current-carrying path of the heater body.

12. The electrical heater assembly of claim 1, wherein the heater body further comprises a double-ended slot including a first end portion extending from the outer periphery, and two second end portions terminating within the heater body.

13. The electrical heater assembly of claim 1, further comprising a catalyst material arranged on or in the heater body.

14. The electrical heater assembly of claim 1, wherein the receptacle portion of at least a first slot of the plurality of slots includes a first cross-sectional shape, and the receptacle portion of at least a second slot of the plurality of slots includes a second cross-sectional shape different from the first cross-sectional shape.

15. The electrical heater assembly of claim 1, wherein each receptacle portion includes at least one of a circular, rectangular, square, polygonal, trapezoidal, or ellipsoidal cross-sectional shape.

16. The electrical heater assembly of claim 1, wherein the plurality of slots are arranged in parallel to each other.

17. The electrical heater assembly of claim 1, wherein the plurality of slots extend into the heater body such that an opening to each slot is alternatingly arranged on opposite sides of the outer periphery so as to define the serpentine current-carrying path.

18. An exhaust treatment assembly comprising an outer housing containing an aftertreatment component and the electrical heater assembly of claim 1.

19. The exhaust treatment assembly of claim 18, wherein the aftertreatment component comprises a catalyst substrate or particulate filter.

20. The exhaust treatment assembly of claim 18, wherein the electrical heater assembly is positioned upstream of the aftertreatment component with respect to an exhaust flow direction through the outer housing.

* * * * *